US011063482B2

(12) United States Patent
Kazama et al.

(10) Patent No.: US 11,063,482 B2
(45) Date of Patent: Jul. 13, 2021

(54) STATOR AND MOTOR HAVING THE SAME

(71) Applicant: Samsung Electronics Co., Ltd., Suwon-si (KR)

(72) Inventors: Osamu Kazama, Yokohama (JP); Katsuhisa Mukai, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 540 days.

(21) Appl. No.: 15/657,513

(22) Filed: Jul. 24, 2017

(65) Prior Publication Data

US 2018/0076673 A1    Mar. 15, 2018

(30) Foreign Application Priority Data

Jul. 28, 2016  (JP) .............................. JP2016-148529
Feb. 27, 2017  (JP) .............................. JP2017-035289
Apr. 27, 2017  (KR) ........................ 10-2017-0054477

(51) Int. Cl.
| | | |
|---|---|---|
| *H02K 1/14* | (2006.01) | |
| *H02K 15/095* | (2006.01) | |
| *H02K 1/18* | (2006.01) | |
| *H02K 3/18* | (2006.01) | |
| *H02K 3/52* | (2006.01) | |
| *H02K 3/34* | (2006.01) | |

(52) U.S. Cl.
CPC .............. *H02K 1/148* (2013.01); *H02K 1/185* (2013.01); *H02K 3/18* (2013.01); *H02K 3/34* (2013.01); *H02K 3/52* (2013.01); *H02K 3/522* (2013.01); *H02K 15/095* (2013.01)

(58) Field of Classification Search
CPC .......... H02K 1/185; H02K 1/148; H02K 1/18; H02K 3/30; H02K 3/32; H02K 3/18; H02K 3/34; H02K 3/52; H02K 3/521; H02K 15/095
USPC .................................... 310/216.009, 216.008
See application file for complete search history.

(56) References Cited

U.S. PATENT DOCUMENTS

| | | | |
|---|---|---|---|
| 2007/0046132 A1 | 3/2007 | Yamamoto et al. | |
| 2009/0026873 A1* | 1/2009 | Matsuo .................. | H02K 1/148 310/216.009 |
| 2013/0328418 A1* | 12/2013 | Ewert .................... | H02K 1/148 310/43 |

(Continued)

FOREIGN PATENT DOCUMENTS

| | | |
|---|---|---|
| JP | 2002-281697 | 9/2002 |
| JP | 2004-208358 | 7/2004 |

(Continued)

OTHER PUBLICATIONS

Umegaki (JP 2011019360 A) English Translation (Year: 2011).*

(Continued)

*Primary Examiner* — Tulsidas C Patel
*Assistant Examiner* — Robert E Mates
(74) *Attorney, Agent, or Firm* — Staas & Halsey LLP

(57) ABSTRACT

A stator and a motor include a plurality of split cores disposed in an annular shape and a connector configured to connect the plurality of split cores to allow a circumferential spacing distance between the split cores to be changed, wherein a diameter of the stator is changed by changing the spacing distance between the split cores in a state in which the plurality of split cores disposed in an annular shape by the connector.

14 Claims, 18 Drawing Sheets

(56) References Cited

U.S. PATENT DOCUMENTS

2014/0292124 A1 10/2014 Nakamura et al.
2014/0339935 A1* 11/2014 Harada .................. H02K 3/345
　　　　　　　　　　　　　　　　　　　　　　310/71

FOREIGN PATENT DOCUMENTS

| JP | 2007-166750 | | | 6/2007 | |
|---|---|---|---|---|---|
| JP | 2011-19360 | | | 1/2011 | |
| JP | 2011019360 | A | * | 1/2011 | |
| JP | 2011-234562 | | | 11/2011 | |
| JP | 2016-73137 | | | 5/2016 | |
| KR | 10-2011-0114150 | | | 10/2011 | |
| KR | 20110114150 | A | * | 10/2011 | |
| WO | WO-2015173932 | A1 | * | 11/2015 | ............... H02K 1/18 |

OTHER PUBLICATIONS

Cho Hugh Jin (KR 2011114150 A) English Translation (Year: 2011).*
Umeda (WO 2015173932 A1) English Translation (Year: 2015).*
Extended European Search Report dated Jun. 14, 2019 in European Patent Application No. 17834738.1.
International Search Report dated Nov. 9, 2017 in International Patent Application No. PCT/KR2017/007995.

* cited by examiner

STATOR AND MOTOR HAVING THE SAME

CROSS-REFERENCE TO RELATED APPLICATIONS

This application claims the benefit of Japan Patent Application No. 2016-148529 filed on Jul. 28, 2016 in the Japan Patent Office, Japan Patent Application 2017-035289 filed on Feb. 27, 2017 in the Japan Patent Office, and Korean Patent Application No. 10-2017-0054477 filed on Apr. 27, 2017 in the Korean Intellectual Property Office, the disclosures of which are incorporated herein by reference.

BACKGROUND

1. Field

The following description relates to a stator and a motor provided with such a stator.

2. Description of the Related Art

In conventional stators used for a motor, a stator has an annular core provided with teeth formed integrally therewith, and a wire is wound around the teeth.

When the wire is wound around each tooth, a winding machine in which a nozzle winding the wire is moved upward and downward is employed. After completing a winding for one tooth, the winding machine moves the nozzle in a circumferential direction of the stator to wind the wire around a next tooth.

When the wire is wound around the teeth through the winding machine, the nozzle should be moved upward and downward between two adjacent teeth. Therefore, a predetermined space through which the nozzle can pass should be secured between the teeth. In the stator, therefore, there is a limitation in increasing an area occupied by the wire by a predetermined amount or more.

Among the stators, therefore, there is a stator including a plurality of split cores which are split in a circumferential direction to further increase an area occupied by a wire.

Japanese Patent Laid-Open Publication No. 2001-103690 discloses a stator in which a wire is wound around teeth of respective split cores in a state in which a plurality of split cores are linearly connected to each other. After winding for all the teeth provided in the split cores is completed, the split cores disposed at both ends are connected to form an annular core.

In such a stator, because the winding is performed in a state in which the plurality of split cores are linearly arranged, a distance between the teeth can be sufficiently enlarged when the wire is wound. Therefore, more wires can be wound while securing a sufficient space through which the nozzle passes, so that it is possible to increase an area occupied by the wire.

However, in the stator having the above-described structure, because a winding is performed in a state in which a plurality of split cores are linearly connected to each other, the above-described conventional winding machine, that is, the winding machine in which after completing a winding for one tooth, the nozzle is moved in the circumferential direction to wind the wire around a following tooth could not employed. Therefore, a new winding machine has to be introduced.

Further, when the winding is completed and the split cores disposed at both ends are connected, it is necessary to twist the connected split cores in order to insert a pin portion formed on the split core disposed at one end into an elongated hole formed on the split core disposed at the other end. Therefore, not only is a dedicated jig required, but also workability is low. In order to smoothly connect the split cores disposed at both ends, it possible to consider that the connecting portion for these split cores has a configuration which differs from that of another connecting portion. However, this poses a problem in that the manufacturing efficiency is lowered.

Japanese Patent Laid-Open Publication No. 2002-281697 discloses a stator which enables a wire to be wound in a state in which a plurality of split cores are annularly disposed. The split core is formed by alternately stacking a plurality of first steel plates and second steel plates, and a protrusion is formed on one circumferential side end of the first steel sheet and an elongated hole is formed in the other circumferential side end of the second steel sheet. Herein, the protrusion passes through the elongated hole.

A spacing distance between two split cores is changed by moving the protrusion formed on one split core of two circumferentially adjacent split cores in the elongated hole formed in the other split core. Therefore, it is possible to wind the wire in a state in which the spacing distance between the split cores is sufficiently secured and more wire can be wound while securing a sufficient space through which the nozzle passes, so that an area occupied by the wire can be further increased.

In the above-described stator, however, because it is necessary to alternately form the protrusion or the elongated hole on or in each of the plurality of steel plates, a manufacturing cost is increased due to the complexity of the mold for manufacturing the split cores. Also, because the steel sheet is provided with the elongated holes formed therein, there is a problem in that magnetic resistance is increased due to the elongated holes, thereby decreasing the efficiency of the stator.

SUMMARY

Therefore, it is an aspect of the present disclosure to provide a stator capable of wiring a wire around a tooth using an existing winding machine and further increasing an area occupied by the wire wound around the tooth, and a motor including such a stator.

Additional aspects of the disclosure will be set forth in part in the description which follows and, in part, will be obvious from the description, or may be learned by practice of the disclosure.

In accordance with an aspect of the present disclosure, a stator includes a plurality of split cores arranged in an annular shape, each split core of the plurality of split cores including a tooth around which a respective wire is wound, and a plurality of insulators respectively disposed on the plurality of split cores and configured to insulate the plurality of split cores from the respective wires, each insulator of the plurality of insulators including a connector to connect the plurality of insulators, and thereby connect the plurality of split cores, in a circumferential direction of the stator and allow a spacing distance between adjacent split cores in the plurality of split cores to be changed.

The stator may further include a diffusion angle regulator configured to regulate a change in a diffusion angle of the plurality of split cores in an enlarged diameter state in which the spacing distance between the adjacent split cores is increased.

The diffusion angle regulator may include a pair of regulation surfaces configured to extend in a direction parallel to a direction in which the spacing distance is changed, face each other, and be in surface contact with each other.

The connector may include a sliding groove and a slider configured to move along a sliding groove of an adjacent connector.

The connector may include a flange extending in a radial direction from the insulator and in the circumferential direction of the stator and having a first end portion at a lower level than a second end portion opposite the first end portion, wherein the sliding groove is formed in the first end portion, and the slider protrudes from the second end portion.

The sliding groove may be tilted with respect to the circumferential direction of the stator.

The sliding groove may include a groove formed in the connector and extending in the circumferential direction of the stator, and the slider extends from the connector in the circumferential direction of the stator and is insertable into the sliding groove.

The connector may further include a stopper configured to prevent the slider from being moved along the sliding groove such that the slider is maintained at one end of the sliding groove.

The stopper may include a contraction portion formed in the sliding groove having a narrower width than the one end of the sliding groove.

The stator may further include a deflection reducer configured to reduce a deflection of the wire between the plurality of split cores.

The deflection reducer may include a pair of engaging portions on which the wire is secured, wherein a distance between the pair of engaging portions changes as the spacing distance between the adjacent split cores changes, a first engaging portion of the pair of engaging portions is located above a second engaging portion of the pair of engaging portions; and the wire passes between the pair of engaging portions from an upper side of the first engaging portion and is secured on a lower side of the second engaging portion.

The deflection reducer may be provided between two adjacent insulators of the plurality of insulators.

The pair of engaging portions may protrude outward from the insulator in the circumferential direction of the stator, and in a reduced diameter state in which the spacing distance between the two adjacent split cores is minimized, the pair of engaging portions contact circumferential ends of adjacent insulators to prevent the adjacent insulators from being displaced in a radial direction of the stator.

The stator may further include an axial displacement preventer provided on the adjacent split cores to prevent the adjacent split cores from being axially displaced, wherein the axial displacement preventer includes an upper surface formed on a first split core of the adjacent split cores and facing a first axial direction of the stator and a lower surface formed on a second split core of the adjacent split cores and facing a second axial direction opposite the first axial direction, and the upper surface and the lower surface are in contact with each other in a state in which the adjacent split cores are spaced apart from each other.

The first split core may include a first convex portion provided on a circumferential side surface of the first split core, the second split core may include a second convex portion provided on a circumferential side surface of the second split core facing the circumferential side surface of the first split core, and an upper surface of the first convex portion forms the upper surface and a lower surface of the second convex portion forms the lower surface.

The second split core may include a third convex portion provided at a different location from the second convex portion.

The first split core may include a second concave portion into which the second convex portion is insertable and a third concave portion into which the third convex portion is insertable, and the second split core may include a first concave portion into which the first convex portion is insertable.

In accordance with another aspect of the present disclosure a motor includes a rotor, and a stator including a plurality of split cores arranged in an annular shape, each split core of the plurality of split cores including a tooth around which a respective wire is wound, and a plurality of insulators respectively disposed on the plurality of split cores and configured to insulate the plurality of split cores from the respective wires, each insulator of the plurality of insulators including a connector to connect the plurality of insulators, and thereby connect the plurality of split cores, in a circumferential direction of the stator and allow a spacing distance between adjacent split cores in the plurality of split cores to be changed.

In accordance with another aspect of the present disclosure a stator include a first split core including a first tooth, a second split core including a second tooth, a first insulator disposed on the first split core and configured to insulate the first split core from a first wire wound around the first insulator and the first split core, and including a first connector; and a second insulator disposed on the second split core and configured to insulate the second split core from a second wire wound around the second insulator and the second split core, and including a second connector, wherein the first connector is configured to be connected to the second connector in an adjustable manner such that a spacing distance between the first split core and the second split core is adjustable, thereby making adjustable an area occupied by the first wire and the second wire.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
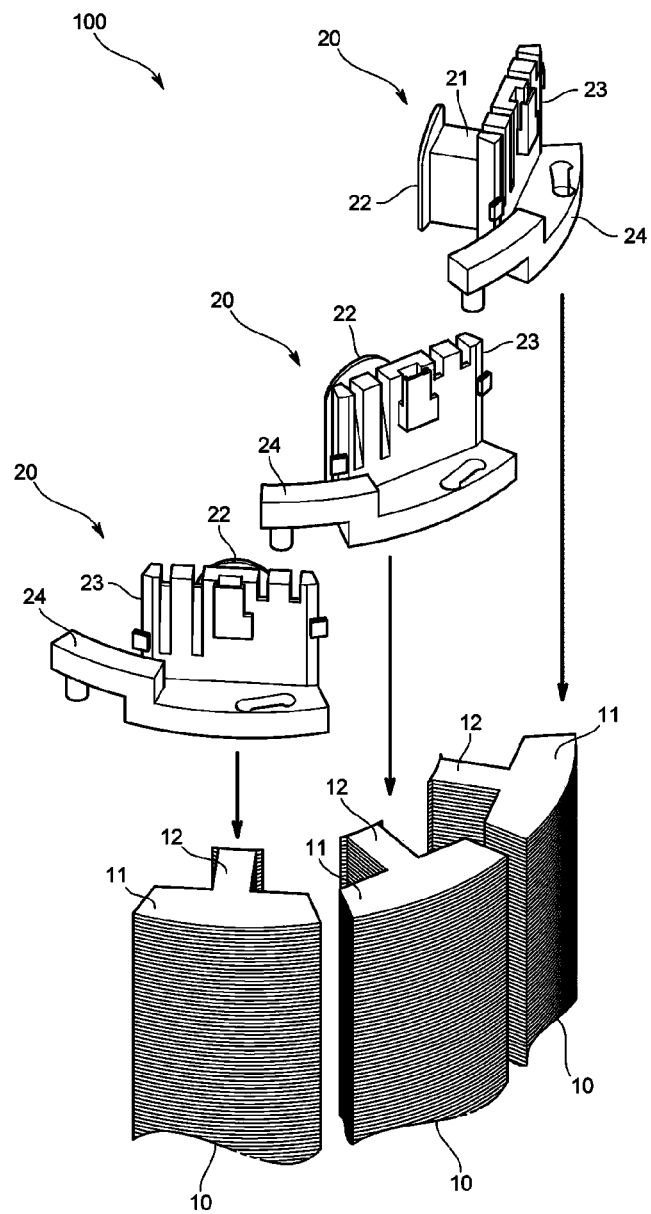
FIG. 1 is an exploded perspective view showing a portion of a stator according to a an embodiment of the present disclosure.

Reference will now be made in detail to the embodiments of the present disclosure, examples of which are illustrated in the accompanying drawings, wherein like reference numerals refer to like elements throughout.

Hereinafter, a stator according to an embodiment of the present disclosure is described with reference to the drawings.

A three-phase alternating current brushless motor includes a stator 100 of an embodiment together with a rotor (not shown) installed inside the stator 100 and a coil formed by a wire wound around the stator 100. More specifically, as shown in FIGS. 1 and 2, the stator 100 includes a plurality of split cores 10 arranged in a circumferential direction to form an annular shape and insulators 20 configured to insulate the coil and the split cores 10 and support coil ends of the coil.

Figure 2:
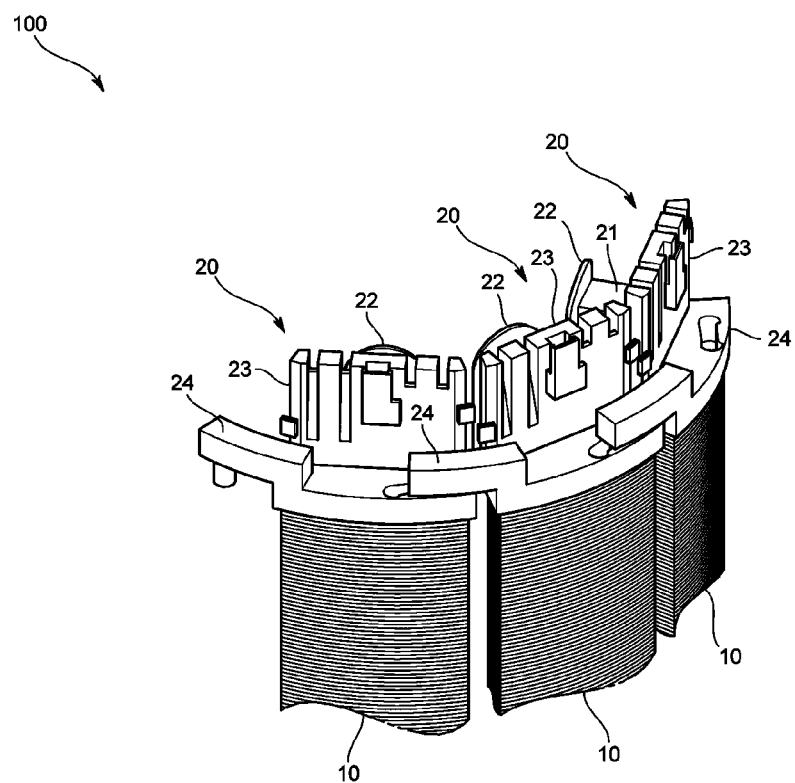
FIG. 2 is a perspective view showing a portion of the stator according to an embodiment of the present disclosure.

As shown in FIG. 1, the split core 10 includes an arc-shaped yoke 11 and teeth 12 protruding inward from the yoke 11 in a radial direction, wherein a wire is wound around the teeth. The split core 10 is formed by stacking a plurality of steel plates.

In an embodiment, the plurality of split cores 10 have the same shape, and each split core 10 includes one tooth 12. However, all the split cores 10 do not have to have the same shape, and one split core 10 may also include a plurality of teeth 12.

The insulator 20 is formed of an insulating material such as a resin or the like. The insulator 20 is installed on each of an upper portion and a lower portion of the split core 10 through a press fitting process or the like so that the insulator 20 is not separated or displaced from the split core 10. Therefore, workability can be ensured.

In an embodiment, the insulator 20 may be coupled to the upper portion of the split core 10 from above or coupled to the lower portion of the split core 10 from below. To this end, the insulator 20 includes a recess (not shown) formed in a tapered shape which is narrowed with respect to shapes of teeth of the upper and lower portions of the split core.

The method of fixing the insulator 20 to the split core 10 is not limited to the above-described method. In an embodiment, a shape of each split core 10 in a top view and a shape of each split core 10 in a bottom view are substantially equal to each other, and all the insulators 20 have the same shape.

Hereinafter, a structure in which the insulator 20 is installed on the upper portion of the split core 10 will be described as an example.

Regarding a shape of the split core, a shape in a top view may differ from that in a bottom view. In addition, a shape of the insulator 20 installed on the upper portion of the split core 10 may also differ from that of the insulator 20 installed on the lower portion of the split core.

Figure 3:
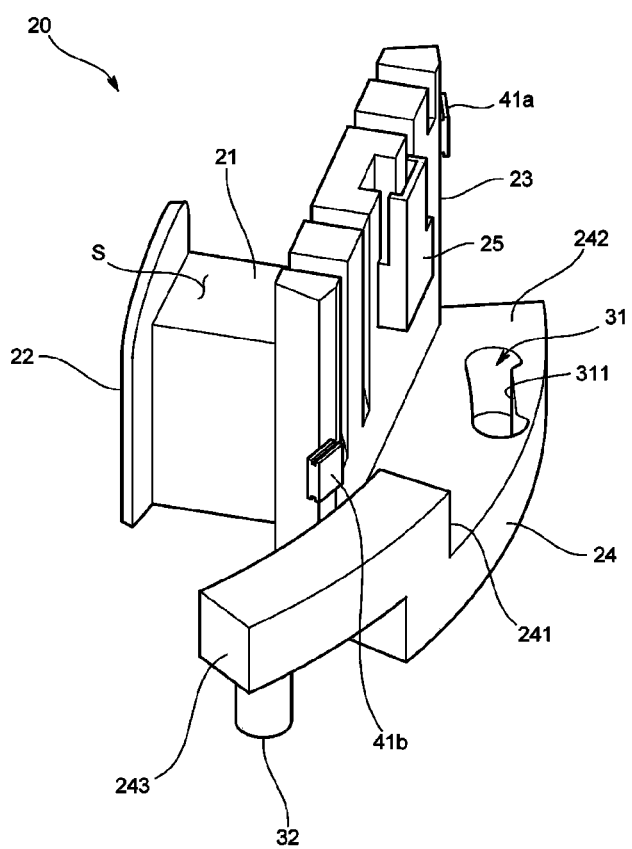
FIG. 3 is a perspective view of an insulator applied to the stator according to an embodiment of the present disclosure.

As shown in FIG. 3, the insulator 20 includes a tooth covering portion 21 configured to cover an upper portion of the tooth 12, an inner upright portion 22 formed on an inner side of the tooth covering portion 21, and an outer upright portion 23 formed on an outer side of the tooth covering portion 21 and opposed to the inner upright portion 22. A space formed by the tooth covering portion 21, the inner upright portion 22, and the outer upright portion 23 forms a coil receiving space S in which a coil (not shown) formed by winding the wire is accommodated. The tooth covering portion 21, the inner upright portion 22, and the outer upright portion 23 are integrally formed.

By the above-described configuration of the insulator 20, the coil accommodated in the coil receiving space S is fixed, and the coil and the tooth 12 are insulated from each other.

Figure 4:
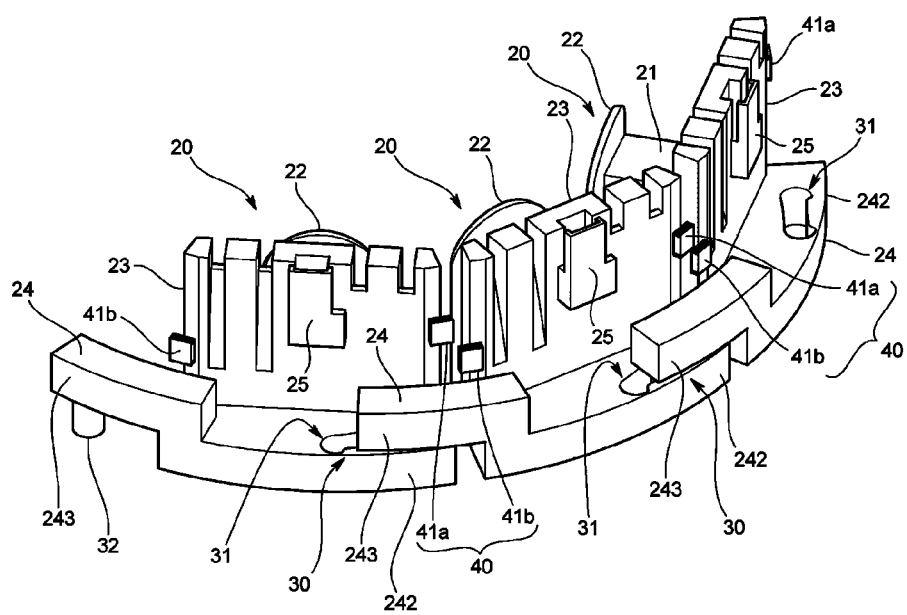
FIG. 4 is a view for describing a configuration of a connector in a driving embodiment of the connector in an embodiment of the present disclosure.
Figure 5:
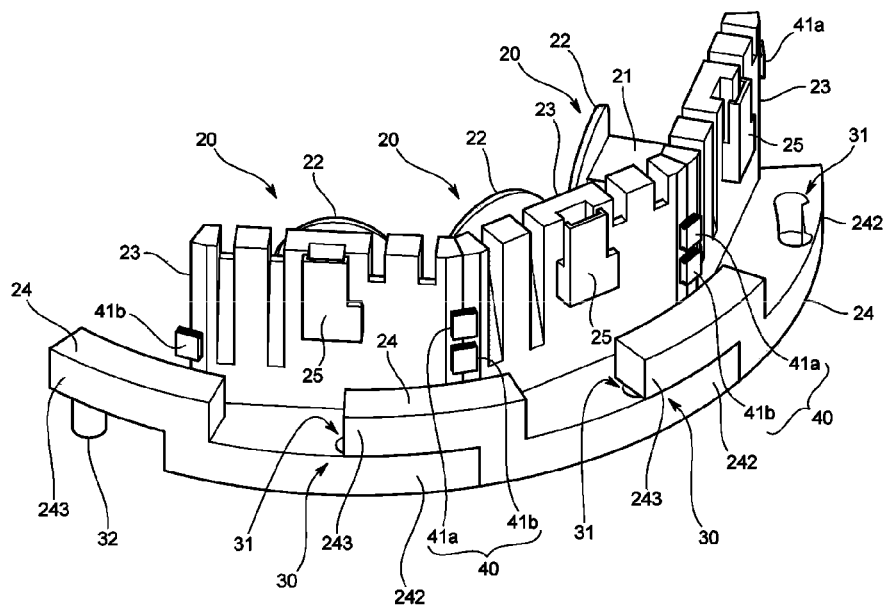
FIG. 5 is a view for describing a configuration of the connector in an embodiment of the present disclosure.

In addition, as shown in FIGS. 4 and 5, the stator 100 includes a connector 30 provided at an upper side and a lower side of the adjacent split cores 10 to connect the adjacent split cores so that a circumferential spacing distance between the split cores 10 may be changed. Here, the spacing distance is a spacing distance between mutually facing side surfaces of adjacent split cores 10.

The connector 30 in an embodiment is provided to allow the adjacent split cores 10 to be moved in the circumferential direction without being pivoted and is installed on the above-described insulator 20. More specifically, in a state where the plurality of split cores 10 are annularly arranged, the adjacent insulators 20 are movably connected to each other in the circumferential direction by the connector 30, so that a spacing distance between the split cores 10 mounted to the insulators 20 may be changed.

The connector 30 is installed on a flange 24 located outside the outer upright portion 23 of the insulator.

The flange 24 extends in the circumferential direction, and a step 241 is formed in the middle of the flange 24. First end portion 242 of the flange 24 is at a lower level than second end portion 243, and second end portion 243 of the flange 24 is positioned above first end portion 242 of the flange 24 of another insulator 20 adjacent to one insulator. The flange 24 and the outer upright portion 23 of an embodiment are integrally formed.

The connector 30 includes a sliding groove 31 formed in first end portion 242 of the flange 24 and a slider 32 formed on and protruding downward from second end portion 243 of the flange 24.

In addition, the connector 30 may include the slider 32 formed on and protruding upward from first end portion 242 of the flange 24 and the sliding groove 31 formed in second end portion 243 of the flange 24.

As shown in FIG. 3, the sliding groove 31 is formed as an elongated hole passing through the flange 24, and obliquely extends from an inside thereof to an outside thereof in a radial direction as the sliding groove 31 is moved from first end portion 242 toward second end portion 243. In the flange 24, in other words, an outer portion of the sliding groove 31 becomes thinner toward second end portion 243 and becomes thicker toward first end portion 242.

The slider 32 is a part inserted into the sliding groove 31 of the adjacent insulator 20 and is moved along the sliding groove 31. As shown in FIG. 3, the slider is formed in a cylindrical shape and protrudes downward from a lower surface of the flange 24.

A diameter of the stator 100 is changed because the circumferentially adjacent split cores 10 are moved by the connector 30 to increase or decrease the spacing distance therebetween. In addition, FIG. 4 shows an arrangement of the insulators 20 in an enlarged diameter state in which a diameter of the stator 100 is maximized, and FIG. 5 shows an arrangement of the insulators 20 in a reduced diameter state in which the diameter of the stator 100 is minimized.

The connector 30 includes a stopper for preventing the slider 32 from being unintentionally moved from one end portion to the other end portion of the sliding groove 31 or from the other end portion to one end portion thereof.

As shown in FIG. 3, the stopper is formed as a contraction portion 311 formed in the sliding groove 31 to narrow a width of the sliding groove. The slider 32 is configured such that a diameter of the slider 32 is approximately equal to or slightly smaller than the width of the sliding groove 31 and is slightly larger than a width of a region of the sliding groove at which the contraction portion 311 is formed.

Therefore, the slider 32 may be maintained at one end side or the other end side of the sliding groove 31, so that the stator 100 may be maintained in the enlarged diameter state or in the reduced diameter state.

As described above, the stator 100 of an embodiment is used in a three-phase AC brushless motor of the motor, and U-phase, V-phase and W-phase wires are wound around the teeth 12.

Figure 6A:
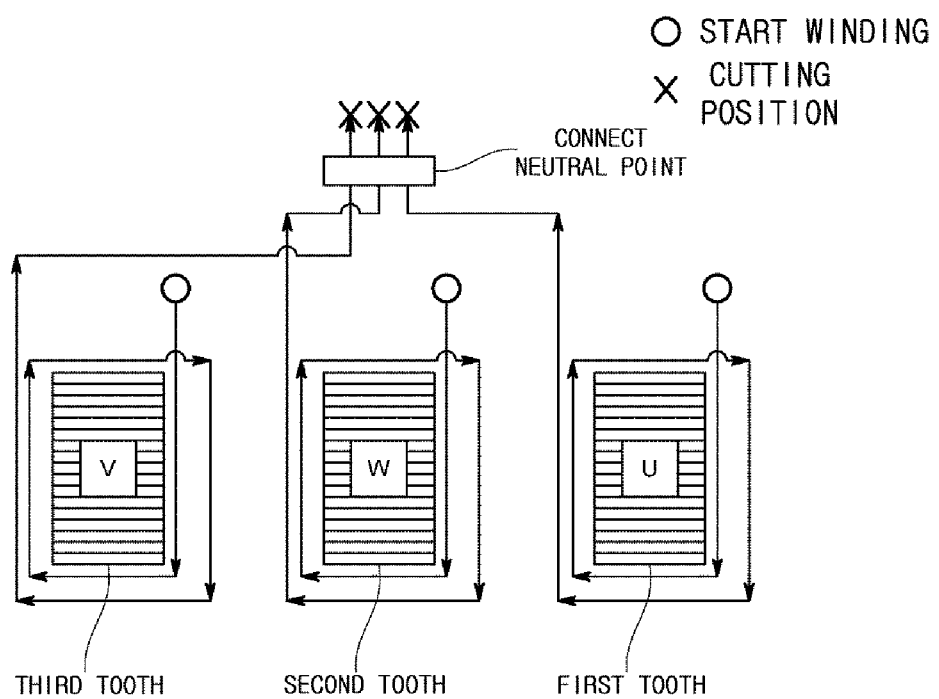
FIGS. 6A and 6B are views for describing a method of winding a wire in an embodiment of the present disclosure.

As an example of such a winding method, as shown in FIG. 6A, the U-phase wire is first wound around the first tooth 12 and is then cut. The W-phase wire is subsequently wound around the second tooth 12 adjacent to the first tooth and is then cut, and the V-phase wire is wound around the third tooth 12 adjacent to the second tooth and is then cut. Further, end portions of the cut wires are tied to connect a neutral point. However, the order of winding the respective phase wires and the arrangement order of the respective phases may be appropriately changed.

In the above method, three wire winding starts and three wire cuts are required until the winding is completed for all the three teeth 12.

Although the wire may also be wound around the tooth 12 by the above-described method, the wire may be wound in a manner which differs from the above-described method in an embodiment.

Figure 6B:
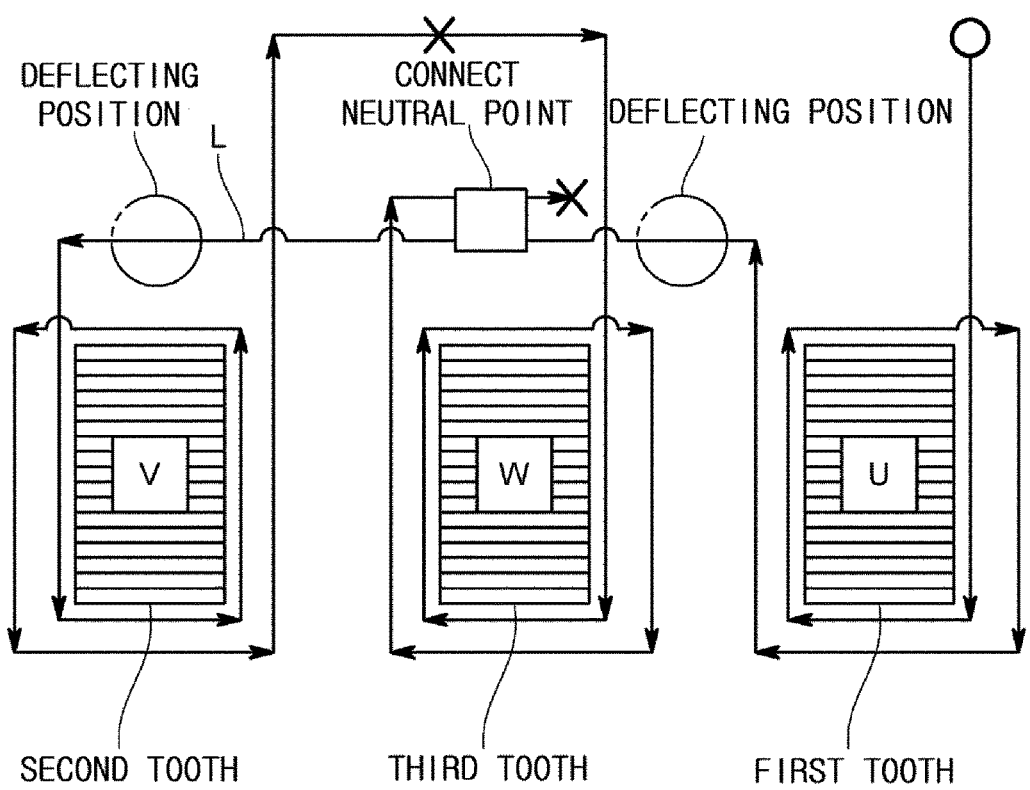

As shown in FIG. 6B, after winding the U-phase wire around the first tooth 12, the V-phase wire is wound around the second tooth 12 adjacent to the first tooth immediately without cutting the U-phase wire, and the W-phase wire is wound around the third tooth 12 located between the first and second teeth without cutting the V-phase wire. Finally, the wire is cut. In addition, a wire portion L spanned between the V-phase wire and the W-phase wire is cut and end portions of the respective phase wires are then tied to connect the neutral point. However, the order of winding the respective phase wires and the arrangement order of the respective phases may be appropriately changed.

In this method, because one wire winding start and two wire cuts are required until the winding is completed for all the three teeth 12, the winding time of the wire can be reduced.

As shown in FIGS. 3 to 5, the insulator 20 of an embodiment includes a connection terminal mounting portion 25 on which a press contact terminal (not shown) used for connecting the neutral point is mounted. The connection terminal mounting portion 25 is formed on an outer circumferential surface of the outer upright portion 23.

When the above-described winding method is employed, the wire portion L of the wire, which is spanned among the respective teeth 12, is formed as shown in FIG. 6B.

When a spacing distance between the adjacent split cores 10 is reduced through the connector 30 in a state in which the wire portion L is formed as above, a deflection is occurred in the wire portion L, so that the insulation distance between the wires forming the respective phases cannot be secured.

Figure 7:
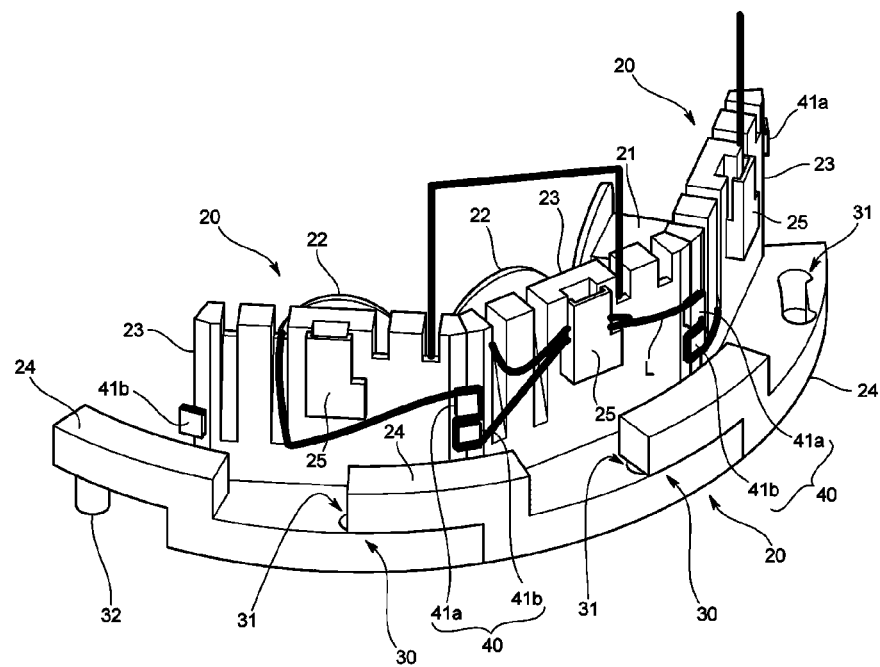
FIG. 7 is a view for describing a configuration of a deflection reducer in an embodiment of the present disclosure.

As shown in FIGS. 4, 5 and 7, therefore, the stator 110 includes a deflection reducer 40 for reducing deflection occurring on the wire portion L when the spacing distance is reduced.

The deflection reducer 40 is formed on each of the upper portion and the lower portion of the adjacent split cores 10 and performs a function thereof when the spacing distance between the split cores 10 is reduced. In other words, the deflection reducer 40 may be configured to allow the deflection occurred on the wire portion L by a reduction of the spacing distance between the split cores 10 to be reduced.

In an embodiment, the deflection reducer 40 provided on the upper portion of the split core 10 has the same construction as that provided on the lower portion of the split core, so that the deflection reducer provided at the upper portion of the split core 10 will be described as a representative example.

As shown in FIGS. 4 and 5, the deflection reducer 40 is provided on the adjacent insulators 20 and the wire portion L is caught on the deflection reducer. The deflection reducer 40 includes a pair of engaging portions 41a and 41b which approach to or are spaced apart from each other in response to an increase and decrease of the spacing distance between the above-described split cores 10.

In an embodiment, one of two engaging portions 41a and 41b is formed on one side of one of two adjacent insulators 20, the other of the two engaging portions 41a and 41b is formed on the other of the insulators 20. A first engaging portion 41a is located above the second engaging portion 41b.

The engaging portions 41a and 41b are formed at both circumferential end portions on the outer circumferential surface of the outer upright portion 23 and each engaging portion is formed to have a rectangle shape in a front view. The engaging portions 41a and 41b protrude radially outward and circumferentially outward from the outer circumferential surface of the outer upright portion 23. When the stator 100 is in the reduced diameter state, that is, in the state in which the spacing distance between two adjacent split cores 10 is minimized, at least a portion of each of the engaging portions 41a and 41b are overlapped with each other when viewed in an axial direction of the stator 100.

As shown in FIG. 7, the engaging portions 41a and 41b are arranged such that the wire portion L passes between the two engaging portions 41a and 41b from an upper side of the first engaging portion 41a and is caught on a lower side of the second engaging portion 41b.

Here, a length of the wire from an upper end of the first engaging portion 41a to a lower end of the second engaging portion 41b in the enlarged diameter state of the stator 100, that is, in the state in which the spacing distance between the adjacent split cores 10 is maximized, is substantially the same as that in the reduced diameter state described above.

Concave grooves are formed in the lower end and the upper end of each of the engaging portions 41a and 41b.

Figure 8:
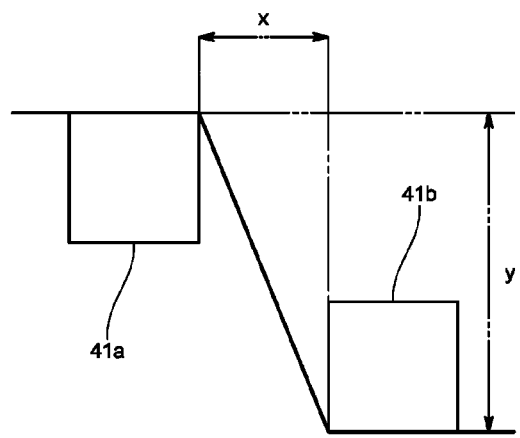
FIG. 8 is a view for describing a design of the deflection reducer in an embodiment of the present disclosure.
Figure 8:
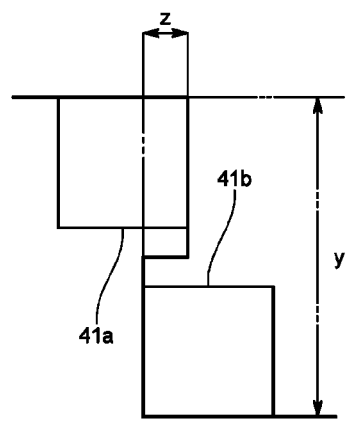

As shown in FIG. 8, assuming that a circumferential spacing distance between of the pair of engaging portions 41a and 41b is x and an axial distance from the upper end of the first engaging portions 41a to the lower end of the second engaging portion 41b is y when the stator 100 is in the enlarged diameter state, and a circumferential length of an overlapping area of the pair of engaging portions 41a and 41b when viewed in the axial direction of the stator is z when the stator 100 is in the reduced diameter state, the engaging portions 41a and 41b are designed to satisfy the following Expression 1.

$$y \div \cos(\tan^{-1}(x/y)) = y + z \tag{1}$$

Because the engaging portions 41a and 41b protrude outward in the circumferential direction from the outer upright portion 23, when the stator 100 is in the reduced diameter state, protruding portions of the engaging portions 41a and 41b face a circumferential end of the outer upright portion 23 of the adjacent insulator 20. Therefore, the engaging portions 41a and 41b also function as a position-deviation preventing part configured to prevent the adjacent insulators 20 from being displaced in the radial direction when the stator 100 is in the reduced diameter state.

The stator 100 constructed as described above may enlarge or reduce the spacing distance between the adjacent split cores 10 in the state in which the plurality of split cores 10 are annularly arranged. Therefore, by winding the wires around the teeth 12 in the state where the spacing distance is enlarged, it is possible to sufficiently secure a space which allows a nozzle of a winding machine to pass through, and to wind a larger amount of wires on the teeth 12. Therefore, it is possible to increase the area occupied by the wire while the conventional winding machine is employed.

Because the connector 30 is provided at the upper side and the lower side of the split core 10, the conventional split core itself can be used without forming the steel sheet constituting the split core 10 into a complicated shape. Therefore, it is possible to provide the practical stator 100 that can be assembled without any difficulty.

Further, because the conventional steel sheet itself can be employed for forming the split core 10, the split core 10 can be manufactured without reducing a magnetic circuit such as forming an elongated hole on the steel sheet.

In addition, because the connector 30 is installed on the conventional insulator 20, it is possible to incorporate the connector 30 in the stator 100 without increasing the number of components.

Also, when the spacing distance between the split cores 10 is narrowed, because the deflection reducer 40 reduces deflection occurring on the wire portion L, the U-phase, V-phase, and W-phase wires are wound around the respective teeth 12 within a short time so that it is possible to sufficiently secure the insulation distance between the respective phase wires even when the wire portion L spanned between the teeth 12 exists.

The present disclosure is not limited to the above embodiment.

Figure 9:
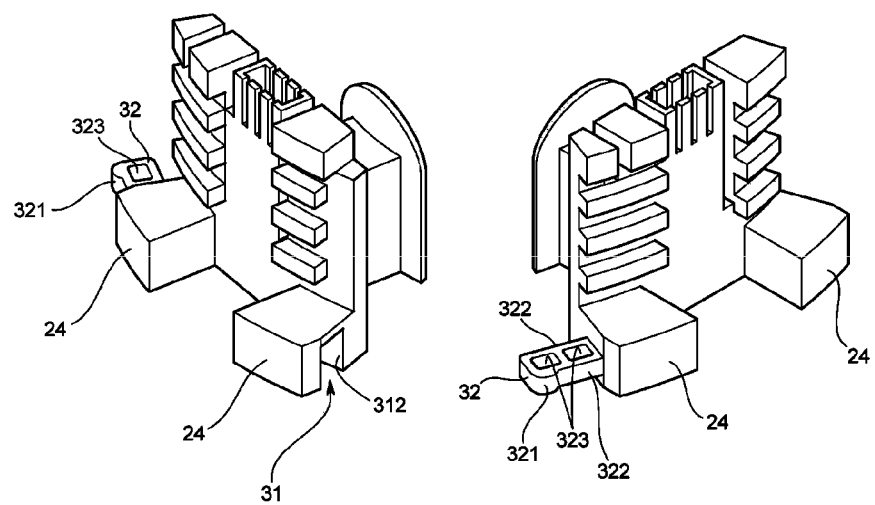
FIG. 9 is a perspective view of an insulator according to an embodiment of the present disclosure.
Figure 10:
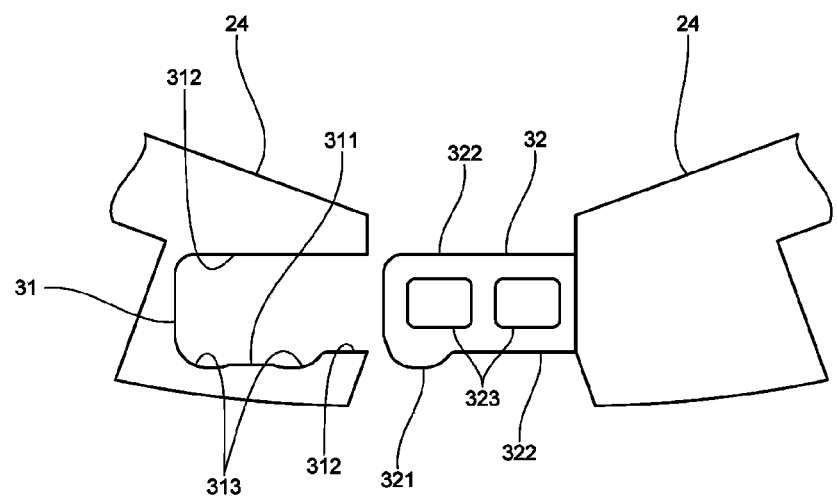
FIG. 10 is a schematic view showing an operation of a connector according to an embodiment of the present disclosure.
Figure 10:
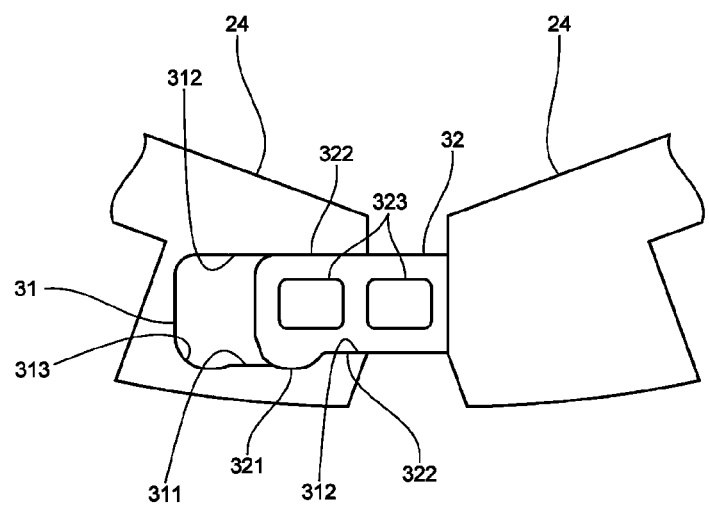

As shown FIGS. 9 and 10, the connector 30 may include the sliding groove 31 concavely formed in the flange 24 and configured to extend in the circumferential direction, and the slider 32 extending linearly from a circumferential end surface of the flange 24 in the circumferential direction and inserted into the sliding groove 31 formed in the flange of the adjacent split core. The flange 24 includes a pair of flanges 24 formed on one circumferential side and the other circumferential side of an outer side of the outer upright portion 23, which are spaced from each other.

The sliding groove 31 includes the contraction portion 311 formed on a middle portion thereof and formed by narrowing a width of the sliding groove, and concave portions 313 formed at both sides of the contraction portion 311.

The slider 32 includes a bulging portion 321 convexly formed at an end portion thereof and extending in a direction perpendicular to an extending direction thereof to be engaged with the contraction portion 311, so that the bulging portion 321 is fitted into the concave portion 313 of the above-described sliding groove 31. A cut-out portion 323 is formed on the slider 32 for reducing the amount of material used.

The connector 30 includes a diffusion angle regulator configured to regulate a change in diffusion angle of the adjacent split cores 10 when the stator 100 is in the enlarged diameter state, that is, in a state in which the spacing distance between the adjacent split cores 10 is maximized.

The diffusion angle regulator includes an inner side surface 312 of the sliding groove 31 and an outer side surface 322 of the slider 32 as the regulation surfaces. The inner side surface 312 of the sliding groove 31 and the outer side surface 322 of the slider 32 are the planes which extend in parallel to a movement direction of the slider 32 and face each other. The inner side surface 312 of the sliding groove 31 and the outer side surface 322 of the slider 32 are in surface contact with each other in a state in which the bulging portion 321 is fitted into the concave portion 313.

Therefore, because the inner side surface 312 of the sliding groove 31 is in surface contact with the outer side surface 322 of the slider 32, when the stator 100 is in the enlarged diameter state, it is possible to prevent the split core 10 from being pivoted and to restrict the diffusion angle from being changed, so that restriction force between the adjacent split cores 10 can be improved to suppress a movement of the split cores 10.

In an embodiment, a depth of the sliding groove 31 is set to be larger than a height of the slider 32 so that a clearance is formed above and below the slider 32, that is, between the slider 32 and the sliding groove 31 and between the slider 32 and the split core 10.

Therefore, even when a height of the split core 10 varies, such a variation can be accommodated by the clearances formed above and below of the slider 32, so that an interference between the slider 32 and the split core 10 can be prevented.

In addition, the flange of the above embodiment has a cylindrical shape, but the shape of the flange is not limited thereto. For example, a planar section parallel to a moving direction may be formed on an outer circumferential surface of the flange, and this planar section may be in surface contact with an inner circumferential surface of the sliding groove.

When the flange has the above configuration, the above-described diffusion angle diffusion angle regulator may be constituted by the outer circumferential surface of the slider and the inner circumferential surface of the sliding groove, so that the restriction force between the adjacent split cores can be improved to suppress a movement of the split cores.

In addition, although the connector is provided on the insulator in the above embodiment, the connector may be provided on an upper portion or a lower portion or on an outer surface of the split core regardless of the insulator.

Also, although the connector is provided on each of the upper and lower sides of the split core in the above embodiment, the connector may be provided on only one of the upper and lower sides of the split core.

Figure 11:
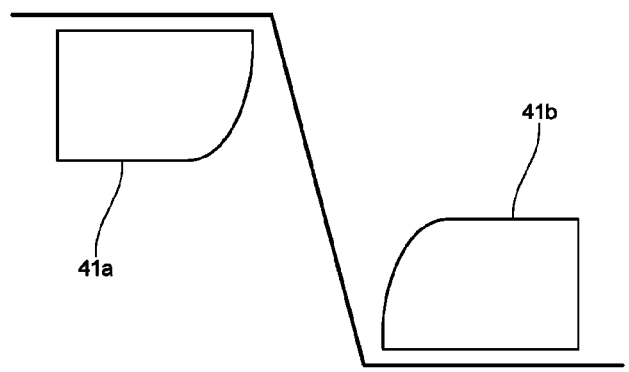
FIG. 11 is a schematic view showing an operation of a deflection reducer according to an embodiment of the present disclosure.
Figure 11:
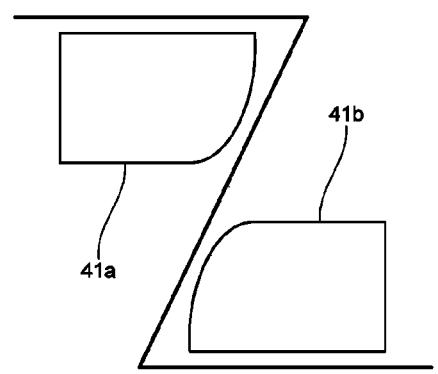

In addition, although the engaging portions constituting the deflection reducer in the above embodiment are formed in a rectangular shape in a front view, the shape of the engaging portion may be variously changed. For example, when the wire has a stiffness not to be bent, the engaging portions 41a and 41b are configured to have a tapered shape gradually tapering toward the electric wire as shown in FIG. 11, so that the wire can be bent easily, thereby reliably reducing the deflection of the wire.

Further, although the deflection reducer is provided at each of the upper and lower sides of the split core in the above embodiment, but the deflection reducer may be provided on only one of the upper and lower sides of the split core.

Furthermore, although the stator in the above embodiment constitutes an inner rotor type brushless motor in which the rotor is disposed inside the stator, it is possible to constitute an outer rotor type brushless motor in which the rotor is disposed outside the stator and a brushless motor in which the rotor is outside and inside the stator.

In addition, although the brushless motor is described as an example of the three-phase AC motor, the present disclosure is not limited thereto, and the present disclosure can be applied to a single-phase AC motor or various other stators of the motor.

Next, a stator according to an embodiment of the present disclosure is described.

Figure 12:
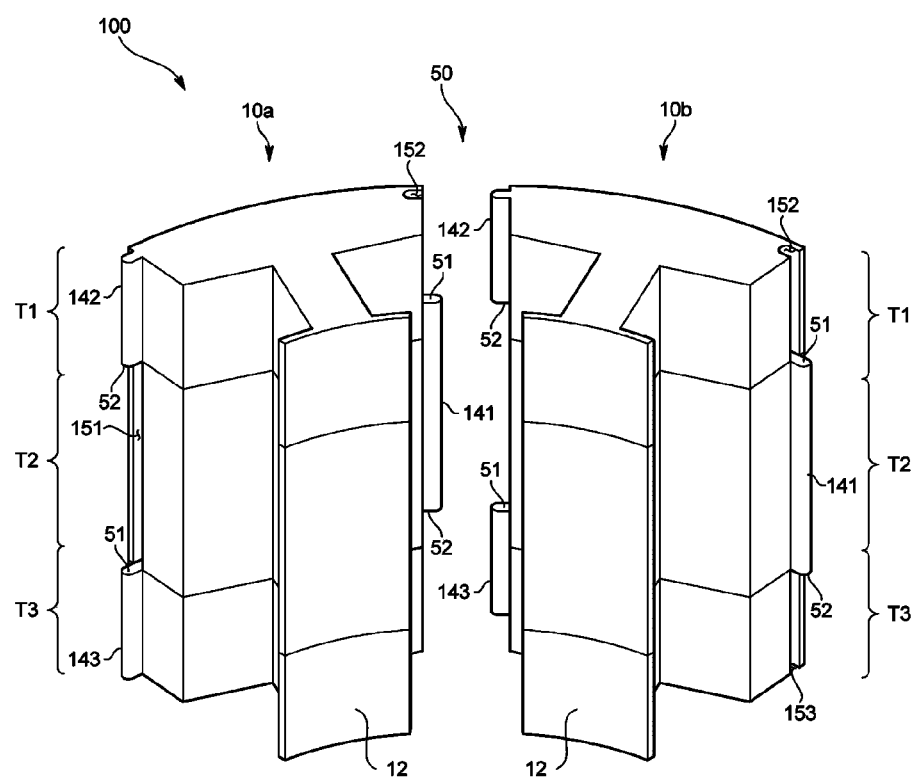
FIGS. 12 and 13 are perspective views partially showing a configuration of a stator of an embodiment of the present disclosure.
Figure 13:
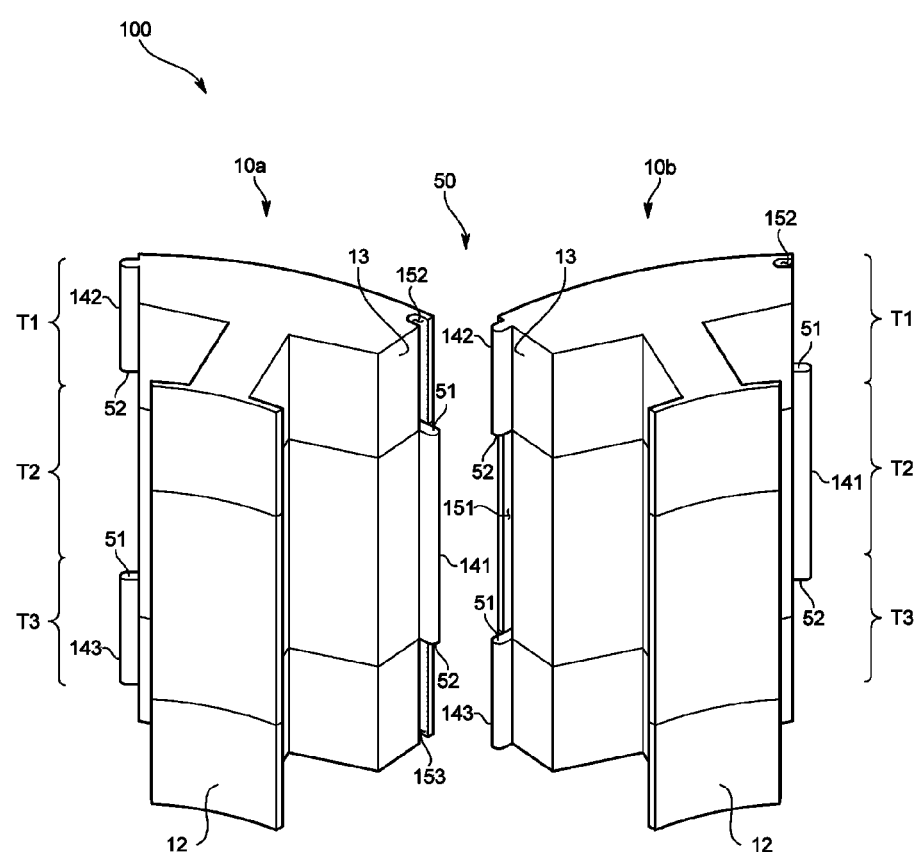

As shown in FIG. 12, a stator 100 according to an embodiment of the present disclosure includes an axial displacement preventer 50 disposed between circumferentially adjacent split cores 10 to prevent the split cores 10 from being displaced in an axial direction. FIG. 13 shows a state in which the split cores 10 are rotated by a predetermined angle in order to more easily understand shapes of side surfaces 13 of the split cores 10 shown in FIG. 12, which face each other.

An axial displacement preventer 50 includes an upper surface 51 formed on one split core 10 of two circumferentially adjacent split cores 10 and facing one axial side (hereinafter, referred to as "the upper side direction") and a lower surface 52 formed on the other split core 10 and facing the other axial side (hereinafter, referred to as "the lower side direction"). Hereinafter, one split core 10 and the other split core 10 are distinguished from each other and are indicated by one split core 10a and the other split core 10b.

The upper surface 51 and the lower surface 52 are formed at substantially the same height in the axial direction in a state where the split cores 10 are annularly arranged, and the upper surface 51 is in contact with the lower surface 52 to support the lower surface 52.

More specifically, as shown in FIG. 13, on the side surfaces 13 of two circumferentially adjacent split cores 10 facing to each other, one split core 10a has a first convex portion 141 formed on a side surface 13 of thereof and protruding toward the other split core 10b, and the other split core 10b has a second convex portion 142 formed on a side surface 13 thereof and protruding toward the one split core 10a. An upper surface of the first convex portion 141 forms the above-described upper surface 51 and a lower surface of the second convex portion 142 forms the above-described lower surface 52. Each of the first convex portion 141 and the second convex portion 142 is formed as a protrusion extending in the axial direction and has the same cross-sectional shape in the axial direction.

Here, in addition, the other split core 10b has a third convex portion 143 which is formed on the side surface 13 thereof, opposite the second convex portion 142, and protrudes toward the one split core 10a. An upper surface of the third convex portion 143 forms the above-described upper surface 51 and a lower surface of the first convex portion 141 forms the above-described lower surface 52. The third convex portion 143, like the first convex portion 141 and the second convex portion 142, is formed as a protrusion extending in the axial direction and has the same cross-sectional shape in the axial direction.

Also, here, the first convex portion 141, the second convex portion 142, and the third convex portion 143 have the same cross-section in a direction orthogonal to the axial direction.

Regarding the convex portions 141, 142, and 143, as shown in FIGS. 12 and 13, the second convex portion 142, the first convex portion 141, and the third convex portion 143 are disposed in order from an upper side in a state in which the split cores 10 are annularly disposed. The lower surface of the second convex portion 142 and the upper surface of the first convex portion 141 are formed at substantially the same height in the axial direction and the lower surface of the first convex portion 141 and the upper surface of the third convex portion 143 are formed at substantially the same height in the axial direction.

In the state in which the split cores 10 are annularly arranged, accordingly, the lower surface 52 of the second convex portion 142 and the upper surface 51 of the first convex portion 141 are in contact with each other so that the second convex portion 142 is supported by the first convex portion 141, and the lower surface 52 of the first convex portion 141 is in contact with the upper surface 51 of the third convex portion 143 so that the first convex portion 141 is supported by the third convex portion 143.

Figure 14:
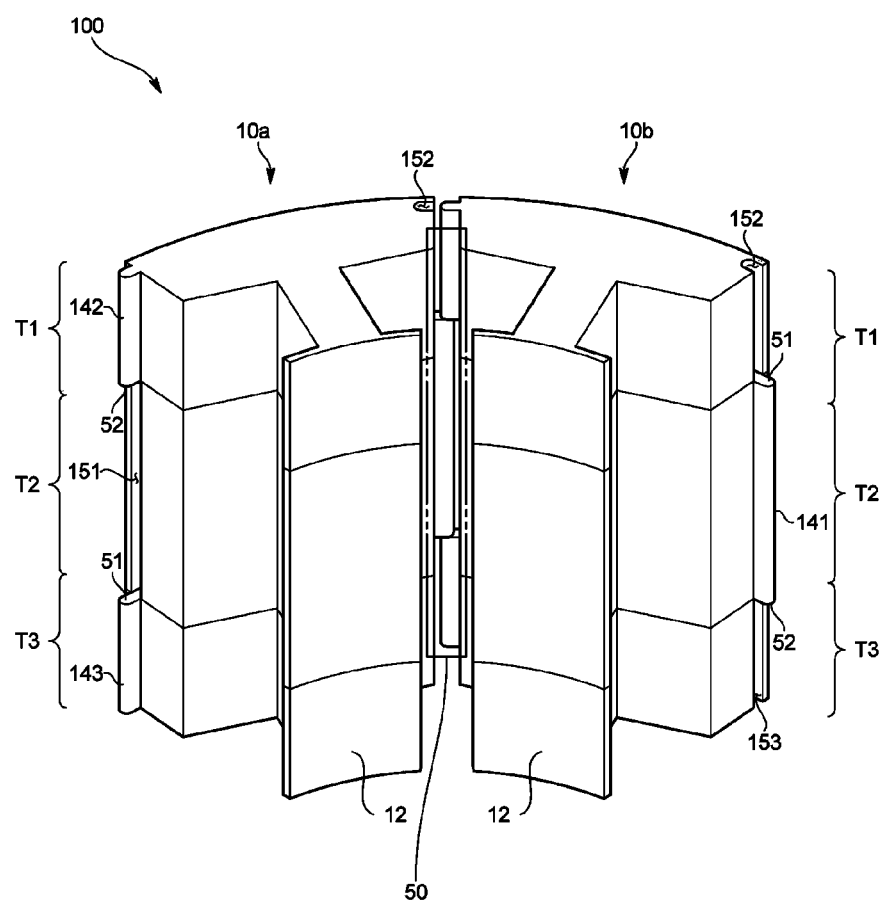
FIG. 14 is a perspective view showing an axial displacement preventer in an embodiment of the present disclosure.

In an embodiment, as shown in FIG. 14, the axial displacement preventer 50 is configured to allow the upper surface 51 and the lower surface 52 to be in contact with each other in the state in which the circumferentially adjacent split cores 10 are spaced apart from each other.

More specifically, a protruding length of each of the convex portions 141, 142, and 143 is set such that, in the state in which the adjacent teeth 12 of two adjacent split cores 10 are spaced from each other to allow the nozzle used for winding the coil to pass therebetween, the upper surface 51 and the lower surface 52 may be brought into contact with each other.

As shown in FIG. 13, a second concave portion 152 into which the second convex portion 142 is insertable and a third concave portion 153 into which the third convex portion 143 is insertable are formed in the side surface 13 of one split core 10a of two adjacent split cores 10, and a first concave portion 151 into which the first convex portion 141 is insertable is formed in the side surface 13 of the other split core 10b.

Each of the concave portions 151, 152 and 153 is a groove concavely formed in the side surface 13 of the split core 10, extending in the axial direction, and having a depth substantially equal to the protruding length of corresponding one of the convex portions 141, 142 and 143 in the circumferential direction. The concave portions 151, 152 and 153 are formed to have substantially the same shape as the corresponding convex portions 141, 142 and 143, so that the convex portions 141, 142 and 143 may be insertable into the corresponding concave portions 151, 152 and 153, respectively, without shaking. Therefore, the mutually facing side surfaces 13 of the circumferentially adjacent split cores 10 are in contact with each other.

The convex portions 141, 142 and 143 and the concave portions 151, 152 and 153 are formed by stacking a plurality of steel plates T, which constitute the split cores 10, in the axial direction.

Figure 15:
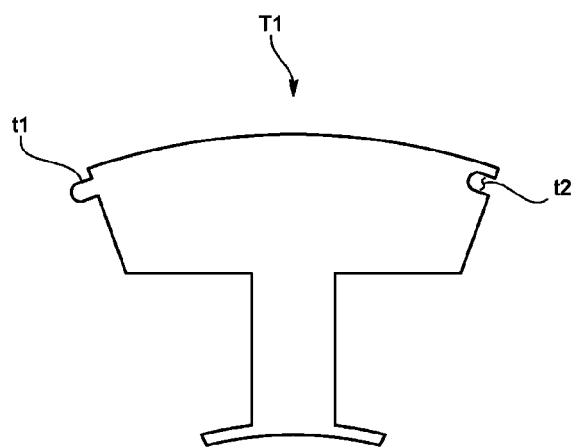
FIG. 15 is a schematic view showing a shape of a steel plate applied to an embodiment of the present disclosure.

More specifically, as shown in FIG. 15, the steel plate T has a protrusion t1 protruding outward in the circumferential direction from one circumferential end and a groove t2 formed on the other circumferential end and concave inward in the circumferential direction. When the steel plates T are stacked, a plurality of protrusions t1 are overlapped with each other to form the convex portions 141, 142 and 143, and the concave portions 151, 152 and 153 are formed by overlapping a plurality of grooves t2. In order to easily fit the convex portions 141, 142 and 143 into the concave portions 151, 152 and 153, respectively, the protrusion t1 has a shape in which a tip portion is narrowed like a semicircle.

In the above embodiment, the split core 10 includes an upper steel plate group T1, an intermediate steel plate group T2 and a lower steel plate group T3 formed by stacking the above-described steel plates T. The steel plates constituting each of the steel plate groups T1, T2 and T3 have the same shape.

Specifically, the steel plates T constituting the upper steel plate group T1 are stacked in a state in which the protrusions t1 are located on one circumferential side and the grooves t2 are located at the other circumferential side.

Like the steel plates T constituting the upper steel plate group T1, the steel plates T constituting the lower steel plate group T3 are stacked in a state in which the protrusions t1 are located on one circumferential side and the grooves t2 are located at the other circumferential side.

The steel plates T constituting the intermediate steel plate group T2 are stacked in a state opposite the steel plates T constituting the upper steel plate group T1 and the lower steel plate group T3, that is, in a state in which the protrusions t1 are located on the other circumferential side and the grooves t2 are located at one circumferential side.

Therefore, in each of the upper steel plate group T1 and the lower steel plate group T3, the convex portion is formed on one circumferential side and the concave portion is formed in the other circumferential side. On the other hand, in the intermediate steel plate group T2, the concave portion is formed in one circumferential side and the convex portion is formed on the other circumferential side.

By forming each of the split cores 10 through these steel plate groups T1, T2 and T3 as described above, the axial displacement preventer 50 is provided between the circumferentially adjacent split cores 10 of all the split cores.

As described above, the axial displacement preventer 50 of an embodiment is configured such that the upper surface of the first convex portion 141 is formed as the upper surface 51, the lower surface of the second convex portion 142 is formed as the lower surface 52 and the upper surface of the third convex portion 143 is formed as the upper surface 51 and the lower surface of the first convex portion 141 is formed as the lower surface 52 so that the upper surface 51 and the lower surface 52 are in contact with each other in the state where the circumferentially adjacent split cores 10 are spaced apart from each other. Therefore, each upper surface 51 can support the lower surface 52 from a lower side. As a result, it is possible to prevent the annularly arranged split cores 10 from being displaced in the axial direction, so that an assembly of the stator 100 is facilitated. Further, because an axial displacement of the split core 10 is prevented, the stress applied to the insulator can be reduced and the strength required for the insulator can be further reduced, thereby reducing materials and manufacturing costs.

By fitting the convex portions 141, 142, and 143 into the corresponding concave portions 151, 152, and 153, respectively, the facing side surfaces 13 of two circumferentially adjacent split cores 10 become in contact with each other. As a result, it is possible to reduce a gap between the side surfaces 13 to suppress a loss of the magnetic flux.

Because the steel plates T constituting the upper steel plate group T1 and the lower steel plate group T3 and the steel plates T constituting the intermediate steel plate group T2 are stacked in directions opposite each other, all the steel plates T constituting the respective steel plate groups T1, T2 and T3 can be formed in the same shape, thereby reducing manufacturing costs.

The axial displacement preventer 50 is not limited to the above embodiment.

For example, the number of the upper surfaces 51 or the lower surfaces 52 formed on one split core 10a and the number of the upper surfaces 51 or the lower surfaces 52 formed on the other split core 10b can be appropriately changed. In other words, the number of convex portions or concave portions formed on or in the side surface 13 of one split core 10a and the number of convex portions or concave portions formed on or in the side surface 13 of the other split core 10b can be appropriately changed.

Figure 16:
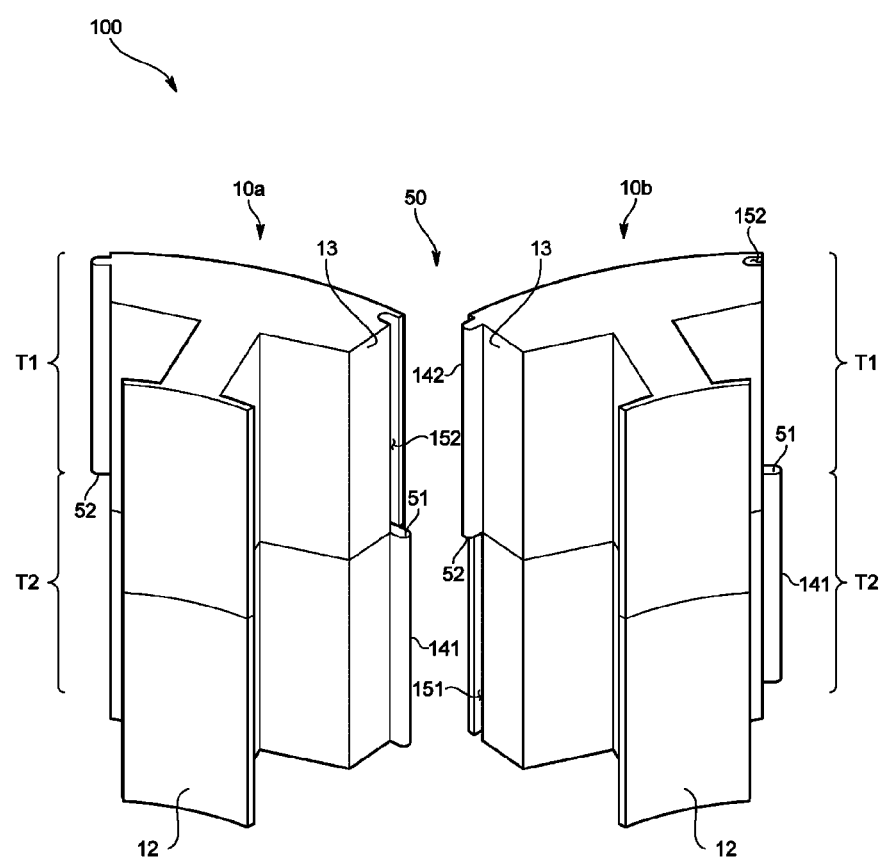
FIGS. 16 and 17 are perspective views partially showing a configuration of a stator according to an embodiment of the present disclosure.

In an example, as shown in FIG. 16, without forming the third convex portion disclosed in the above embodiment, the first convex portion 141 and the second concave portion 152 may be formed at the side surface 13 of one split core 10a of two split cores 10, and the second convex portion 142 and the first concave portion 151 may be formed at the side surface 13 of the other split core 10b.

In addition, it is not necessary to form any concave portion in the side surface 13 of one split core 10a and the side surface 13 of the other split core 10b of two split cores 10.

Figure 17:
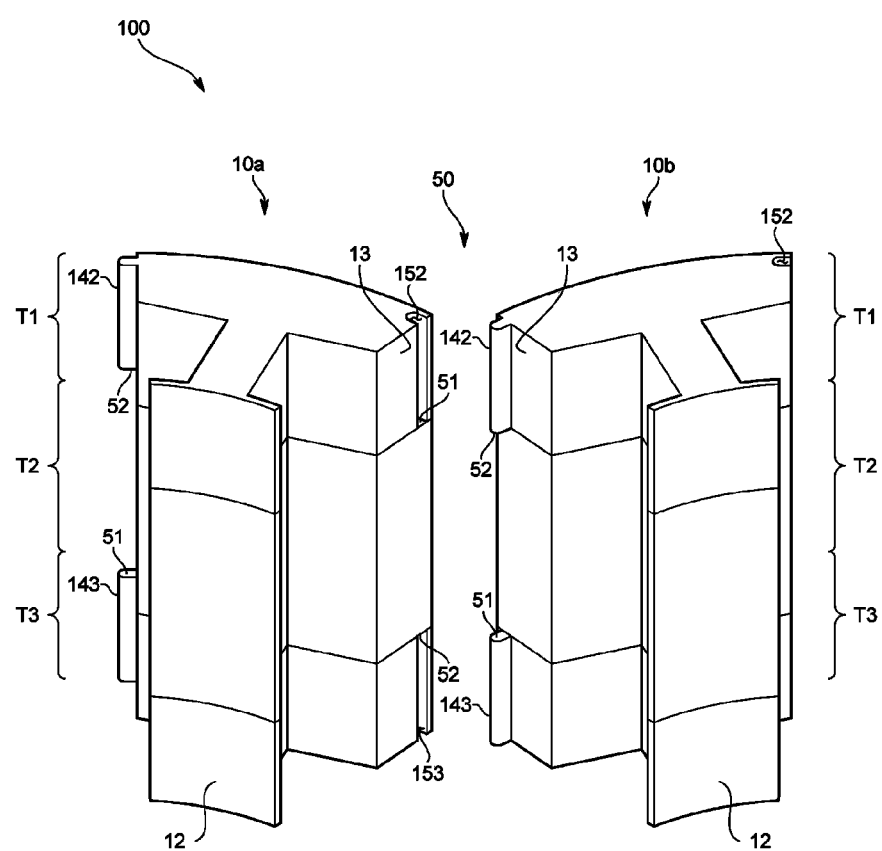

As an example, as shown in FIG. 17, there may be a configuration in which no concave portion is formed in the side surface 13 of the other split core 10b of two adjacent split cores 10. In this case, the lower surface of the second convex portion 142 formed on the side surface 13 of the other split core 10b is formed as the lower surface 52, and a portion of the upper surface of the intermediate steel plate group T2 of one split core 10a, which faces the lower surface 52, is formed as the upper surface 51. In addition, the upper surface of the third convex portion 143 formed on the side surface 13 of the other split core 10b is formed as the upper surface 51, and a portion of the lower surface of the intermediate steel plate group T2 of one split core 10a, which faces the upper surface 51, is formed as the lower surface 52. In such a configuration, for example, by lengthening the protruding lengths of the convex portions 142 and 143 when compared with the previous embodiment, in a state in which the split cores 10 are separated from each other to allow the nozzle to pass between the teeth 12, the upper surface 51 and the lower surface 52 may be brought into contact with each other.

In addition, although the axial displacement preventer 50 may be installed between the circumferentially adjacent split cores 10 of all the split cores, it is also possible to install the axial displacement preventer 50 between the circumferentially adjacent split cores 10 of some of the split cores.

As is apparent from the above description, a stator according to an aspect of the present disclosure and the motor provided with the above stator can increase an area occupied by a wire formed therein, and enables the wire to be wound around teeth through an existing winding machine.

The scope of the present disclosure is not limited to the specific embodiments described above. It should be understood that various other embodiments which may be changed or modified by one skilled in the art without departing from the gist as the technical spirit of the disclosure defined in the appended claims are also within the scope of the present disclosure.

What is claimed is:

1. A motor comprising:
    a rotor; and
    a stator including:
        a plurality of split cores arranged in a closed annular shape, each split core of the plurality of split cores including a tooth around which a respective wire is wound;
        a plurality of insulators respectively disposed on the plurality of split cores and configured to insulate the plurality of split cores from the respective wires, each insulator of the plurality of insulators including a connector to connect the plurality of insulators in the closed annular shape, and thereby connect the plurality of split cores, in a circumferential direction of the stator and allow a spacing distance between adjacent split cores in the plurality of split cores to be changed while the plurality of insulators remain connected in the closed annular shape by moving at least one of the adjacent split cores in the circumferential direction of the stator to thereby change a diameter of the closed annular shape;
        a deflection reducer formed on adjacent split cores and configured to secure the respective wire between adjacent split cores and to reduce a deflection of the respective wire between adjacent split cores when the spacing distance between adjacent split cores is reduced,
        wherein the connector comprises a sliding groove formed along a linear movement direction of an adjacent connector and a slider configured to move along a sliding groove of an adjacent connector,
        wherein the deflection reducer comprises a pair of engaging portions on which the respective wire is secured,
        wherein a distance between the pair of engaging portions changes as the spacing distance between the adjacent split cores changes,
        wherein a first engaging portion of the pair of engaging portions is located above a second engaging portion of the pair of engaging portions,
        wherein the respective wire passes between the pair of engaging portions from an upper side of the first engaging portion and is secured on a lower side of the second engaging portion,
        wherein the pair of engaging portions protrude outward from each insulator of the plurality of insulators in the circumferential direction of the stator, and
        wherein in a reduced diameter state in which the spacing distance between the adjacent split cores is minimized, the pair of engaging portions contact circumferential ends of adjacent insulators to prevent the adjacent insulators from being displaced in a radial direction of the stator.

2. The motor of claim 1, further comprising a diffusion angle regulator configured to regulate a change in a diffusion angle of the plurality of split cores in an enlarged diameter state in which the spacing distance between the adjacent split cores is increased.

3. The motor of claim 2, wherein the diffusion angle regulator comprises a pair of regulation surfaces configured to extend in a direction parallel to a direction in which the spacing distance is changed, face each other, and be in surface contact with each other.

4. The motor of claim 1, wherein the connector comprises:
    a flange extending in a radial direction from each insulator of the plurality of insulators and in the circumferential direction of the stator and having a first end portion at a lower level than a second end portion opposite the first end portion, wherein:
        the sliding groove is formed in the first end portion; and
        the slider protrudes from the second end portion.

5. The motor of claim 1, wherein the sliding groove is tilted with respect to the circumferential direction of the stator.

6. The motor of claim 1, wherein:
    the sliding groove comprises a groove formed in the connector and extending in the circumferential direction of the stator; and
    the slider extends from the connector in the circumferential direction of the stator and is insertable into the sliding groove.

7. The motor of claim 1, wherein the connector further comprises a stopper configured to prevent the slider from being moved along the sliding groove such that the slider is maintained at one end of the sliding groove.

8. The motor of claim 7, wherein the stopper comprises a contraction portion formed in the sliding groove having a narrower width than the one end of the sliding groove.

9. The motor of claim 1, wherein the deflection reducer is provided between two adjacent insulators of the plurality of insulators.

10. The motor of claim 1, further comprising an axial displacement preventer provided on the adjacent split cores to prevent the adjacent split cores from being axially displaced, wherein:
    the axial displacement preventer comprises an upper surface formed on a first split core of the adjacent split cores and facing a first axial direction of the stator and a lower surface formed on a second split core of the adjacent split cores and facing a second axial direction opposite the first axial direction; and
    the upper surface and the lower surface are in contact with each other in a state in which the adjacent split cores are spaced apart from each other.

11. The motor of claim 10, wherein:
    the first split core comprises a first convex portion provided on a circumferential side surface of the first split core,
    the second split core comprises a second convex portion provided on a circumferential side surface of the second split core facing the circumferential side surface of the first split core, and
    an upper surface of the first convex portion forms the upper surface and a lower surface of the second convex portion forms the lower surface.

12. The motor of claim 11, wherein:
    the second split core comprises a third convex portion provided at a different location from the second convex portion.

13. The motor of claim 12, wherein:
    the first split core comprises a second concave portion into which the second convex portion is insertable and a third concave portion into which the third convex portion is insertable; and
    the second split core comprises a first concave portion into which the first convex portion is insertable.

14. A motor comprising:
    a rotor; and
    a stator including:
        a first split core including a first tooth;

a second split core including a second tooth;

a first insulator disposed on the first split core and configured to insulate the first split core from a first wire wound around the first insulator and the first split core, and including a first connector;

a second insulator disposed on the second split core and configured to insulate the second split core from a second wire wound around the second insulator and the second split core, and including a second connector; and a deflection reducer formed on the first split core and the second split core and configured to secure a third wire between the first split core and the second split core and to reduce a deflection of the third wire between the first split core and the second split core when a spacing distance between the first split core and the second split core is reduced, wherein the first connector is configured to be connected to the second connector in an adjustable manner such that the spacing distance between the first split core and the second split core is adjustable while the first connector is connected to the second connector in a closed annular shape by moving at least one of the first connector and the second connector in a circumferential direction of the stator, thereby making adjustable an area occupied by the first wire and the second wire to thereby change a diameter of the closed annular shape, wherein the first connector comprises a sliding groove formed along a linear movement direction of the second connector and the second connector comprises a slider configured to move along the sliding groove of the first connector, wherein the deflection reducer comprises a pair of engaging portions on which the third wire is secured, wherein a distance between the pair of engaging portions changes as the spacing distance between the first split core and the second split core changes, wherein a first engaging portion of the pair of engaging portions is located above a second engaging portion of the pair of engaging portions, wherein the third wire passes between the pair of engaging portions from an upper side of the first engaging portion and is secured on a lower side of the second engaging portion, wherein the pair of engaging portions protrude outward from each of the first insulator and the second insulator in the circumferential direction of the stator, and wherein in a reduced diameter state in which the spacing distance between the first split core and the second split core is minimized, the pair of engaging portions contact circumferential ends of the first insulator and the second insulator to prevent the first insulator and the second insulator from being displaced in a radial direction of the stator.

* * * * *